(No Model.)  3 Sheets—Sheet 1.
W. F. BURROWS.
APPARATUS FOR CARBURETING AIR.
No. 291,676.  Patented Jan. 8, 1884.

Witnesses.  Inventor.
S. N. Piper  Wm. Freeman Burrows.
E. B. Pratt  by R. H. Eddy, atty.

N. PETERS, Photo-Lithographer, Washington, D. C.

(No Model.) 3 Sheets—Sheet 2.

W. F. BURROWS.
APPARATUS FOR CARBURETING AIR.

No. 291,676. Patented Jan. 8, 1884.

Witnesses.

Inventor.
Wm. Freeman Burrows.
by R. H. Eddy atty.

(No Model.) 3 Sheets—Sheet 3.
W. F. BURROWS.
APPARATUS FOR CARBURETING AIR.
No. 291,676. Patented Jan. 8, 1884.
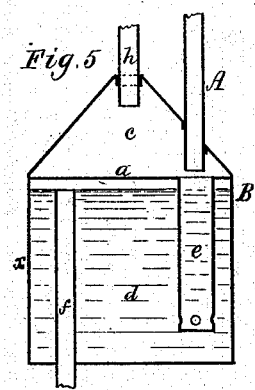
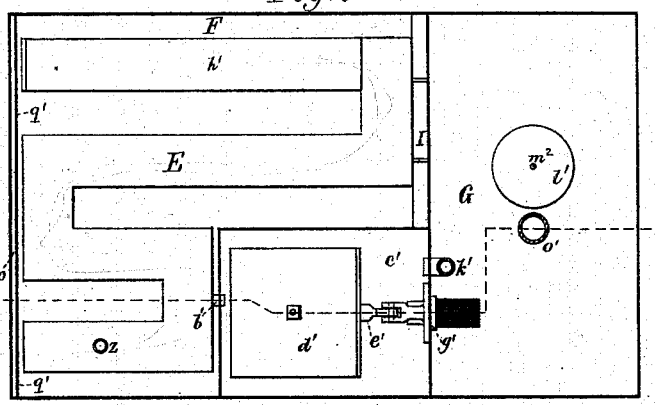
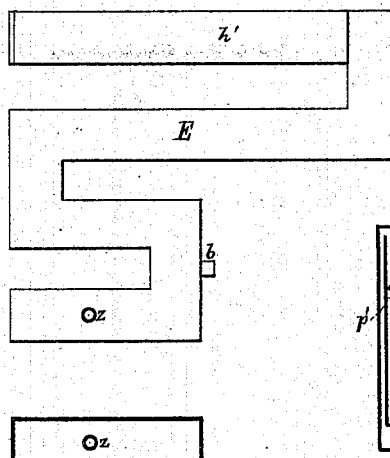
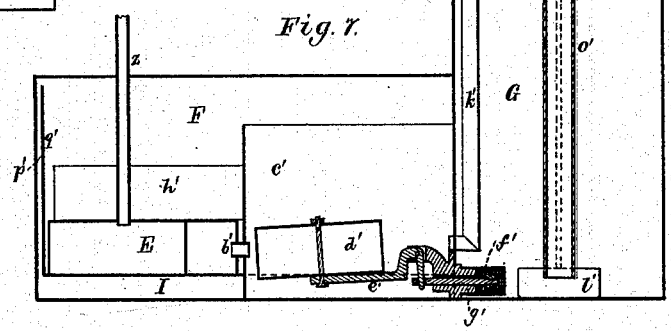
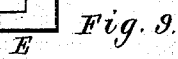
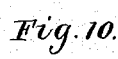
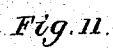
Witnesses.
S. N. Piper.
E. B. Pratt.
Inventor
Wm. Freeman Burrows.
by R. H. Eddy atty.
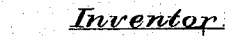

UNITED STATES PATENT OFFICE.

WILLIAM FREEMAN BURROWS, OF BOSTON, MASSACHUSETTS.

APPARATUS FOR CARBURETING AIR.

SPECIFICATION forming part of Letters Patent No. 291,676, dated January 8, 1884.

Application filed August 7, 1883. (No model.)

*To all whom it may concern:*

Be it known that I, WILLIAM FREEMAN BURROWS, of Boston, in the county of Suffolk, of the Commonwealth of Massachusetts, have invented a new and useful Improvement in Apparatus for Carbureting Air; and I do hereby declare the same to be described in the following specification and represented in the accompanying drawings, of which—

Figure 1:
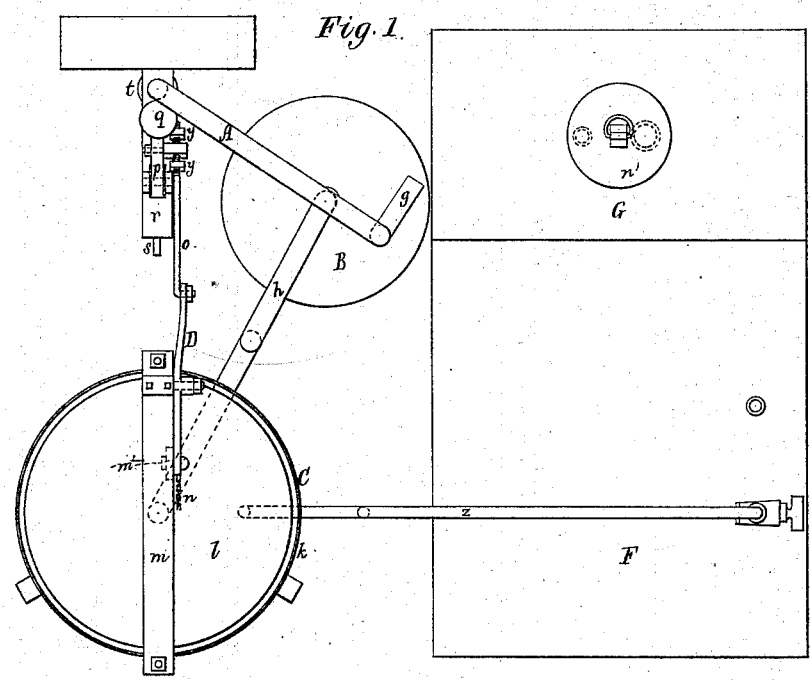
Figure 2:
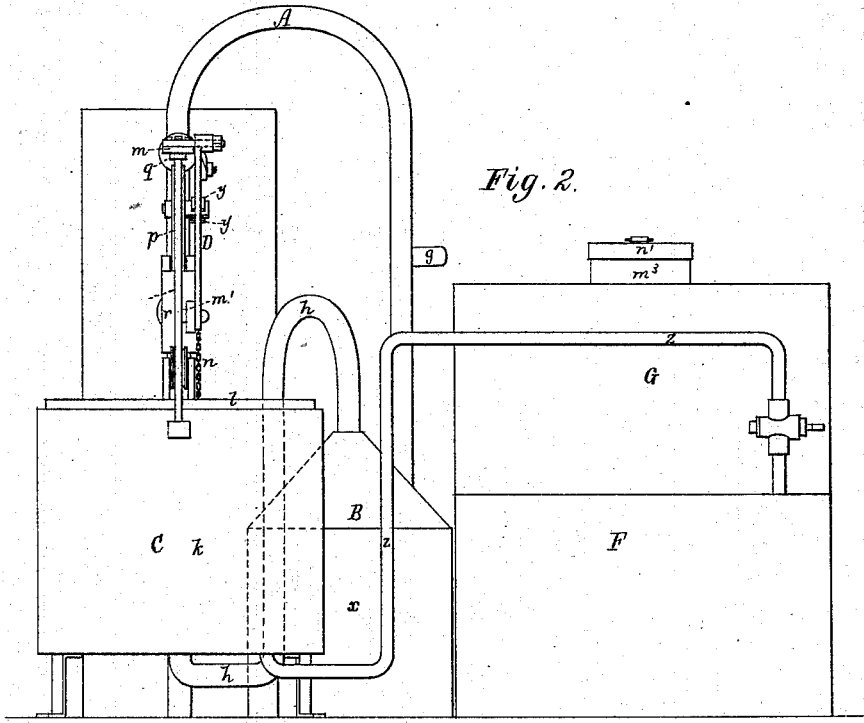
Figure 3:
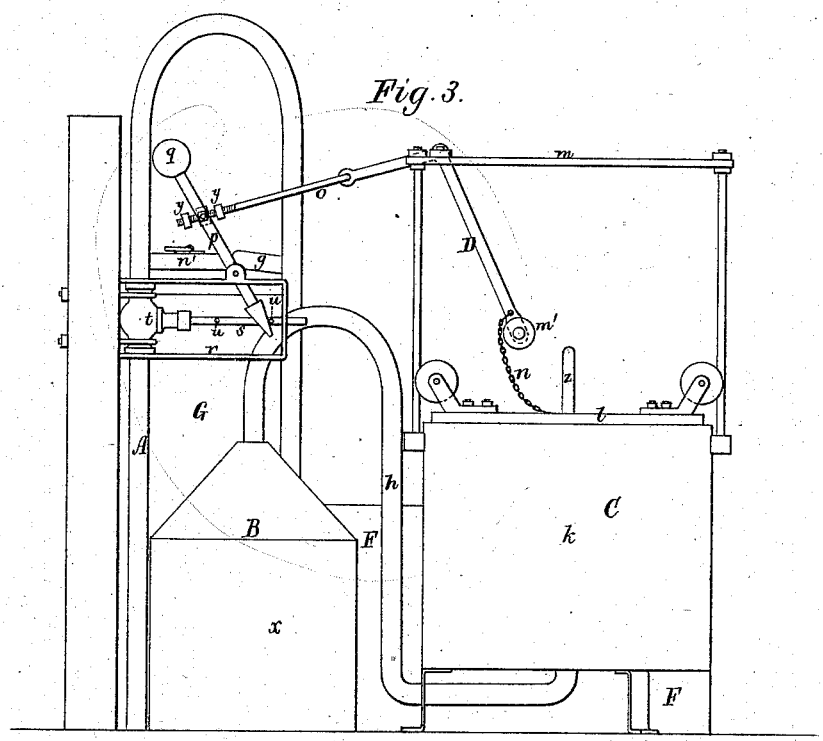
Figure 4:
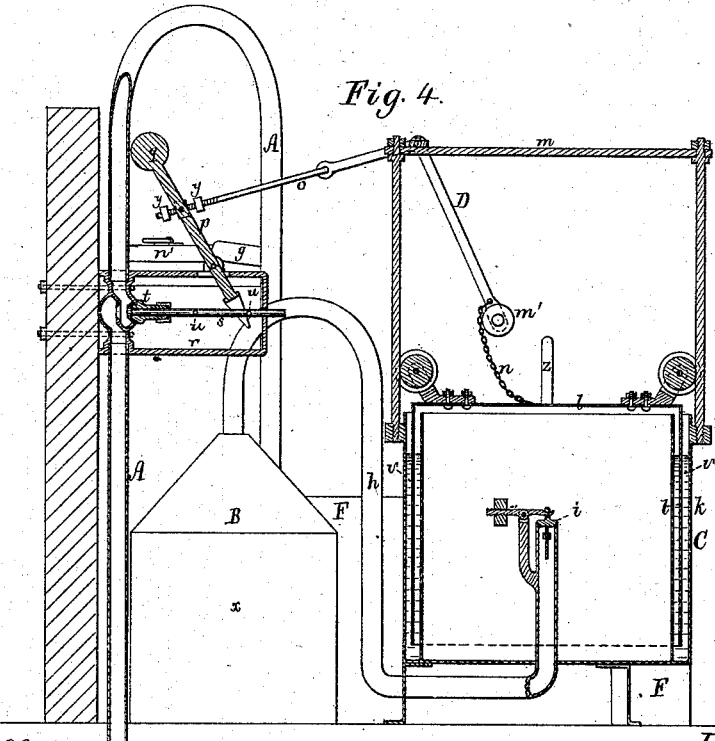

Figure 1 is a top view, Fig. 2 a front elevation, and Fig. 3 an end view, of an air-carburetor of my improved kind. Fig. 4 is a vertical section taken through its aerometer and the valve of the water-induction pipe, to be described. Fig. 5 is a vertical section of the air-trap. Fig. 6 is a horizontal section, and Fig. 7 a vertical and longitudinal section of the carbureted-air receiver, its tortuous carburetor, and supply-tank. Fig. 8 is a top view, Fig. 9 is a bottom view, and Fig. 10 an end elevation, of the tortuous carburetor. Fig. 11 is a longitudinal section of such carburetor, such section being taken through the straining-chamber of the said carburetor.

This apparatus is to be operated by water under a head or pressure, such water being by means of an induct or pipe discharged into an air-trap, through which it flows, and by so doing causes air to be drawn into the trap and forced into the aerometer. By the latter such air is driven into and through the tortuous or serpentine carburetor, and thence into the receiver, to be from the latter drawn by pipes to burners, for being inflamed for illuminating or heating purposes.

In the drawings, A denotes the water-induction pipe, which leads into the upper part of the air-trap. This air-trap B consists of a vessel, x, having a partition, a, extending across it, so as to divide it into two chambers, c and d. A pipe, e, leads from the upper of such chambers downward into the lower one nearly to its bottom. Another or discharge pipe, f, leads into the said bottom, and extends above such nearly up to the partition a. The pipe e is placed immediately under the discharging end of the pipe A. A short pipe, g, leads out of the pipe A, as shown. From the top of the upper chamber of the air-trap a pipe, h, leads to the central part of the bottom of the aerometer C, there being to the opening of the said pipe into the aerometer a valve, i, to open upward. This valve, like that of the barrel of a force-pump, serves to prevent back movement of the air through the pipe during a descent of the aerometer-bell.

The aerometer C consists of a tank, k, and a bell, l, such aerometer being to all intents and purposes like a common gasometer. The guide-frame m of the bell has fulcrumed to it a knee-lever, D, whose longer arm is furnished with a friction-roller, m', and is connected to the top of the bell by a chain, n. A connection-rod, o, leads from the shorter arm of the said lever to a valve-tripping lever, p, which has a weight, q, fixed to its upper end. This lever, fulcrumed in a stationary bracket, r, is bifurcated at its lower end, and straddles the stem s of the valve of a cock, t, arranged in the induction-pipe A. In the said stem s are two pins, u u, which go through it transversely of it. The water, in rushing rapidly through the pipe A and thence into and through and out of the air-trap, will draw air into the pipe g, and force such air downward into the upper chamber of the air-trap, the lower chamber of which will contain water up to the top of its discharge-pipe. This water, extending above the lower end of the inlet-pipe e, will seal such pipe, so as to prevent any air from flowing into it from the chamber. The air carried or forced by the pipe A into the air-trap B will be expelled from it into the aerometer or the bell thereof, and in being condensed therein will cause the bell to rise in the water v of the tank. As the bell thus rises or is forced upward it will come into contact with and move the knee-lever, so as to cause such to pull forward the tripping-lever, whereby the valve of the induction-pipe A will be closed on the bell having attained a sufficient altitude. The connection-rod o slides freely through a projection pivoted to the upper arm of the tripping-lever, and there are on the said rod two nuts or stops, y y, for actuating the said lever at the proper times to raise it into positions for its weight to move it and cause it to move the valve of the cocks either for closing or opening such valve.

From the above it will be seen that on the bell of the aerometer falling to a certain distance within its tank the cock of the water-induction pipe A will be opened to allow water to flow into and through the air-trap, and thereby cause air to be forced into the aerometer. The aerometer, thus having air forced into it, will rise in the tank, and on attaining a sufficient altitude therein will cause the cock of the pipe A to close, and thereby stop the flowage of water through the air-trap. A pipe, $z$, leads out of the aerometer and into the carburetor E, placed within a chamber or receiver, F. This carburetor is a tortuous passage containing wicks $a'$, affixed to its inner surface. It rests on the bottom of the receiver F, and by means of a short pipe, $b'$, communicates with a chamber, $c'$, situated within the receiver. In this chamber $c'$ there is a float, $d'$, which is attached to a lever, $e'$, for moving the spindle of a valve, $f'$, adapted to the eduction-pipe $g'$ of a tank, G, for supplying the carburetor with gasoline. By means of the float the valve $f'$ will be closed on the gasoline attaining a sufficient height in the carburetor, whose wicks enter the fluid, and by capillary attraction raise it and expose it to the air that may be passing through it, (the said carburetor.) The carburetor is provided with a strainer, $h'$, which is a chamber containing sawdust or a suitable stuffing for the carbureted air to pass through before escaping into the receiver F.

In the tank G there is a pipe, $k'$, which at its lower end opens into the float-chamber $c'$, the said pipe being also open at its upper end, and extended nearly to the top of the tank. The said pipe, by communicating with the chamber $c'$ and the upper part of the tank, enables liquid from the tank to readily flow therefrom into the float-chamber when the valve of the educt of the tank may be off its seat. Were it not for the pipe $k'$, the liquid, in descending in the tank, would so rarefy the air therein as to be prevented thereby from passing out of the tank. In the tank is a float, $l'$, whose stem $m^2$ extends upward, and slides freely through the top of the tank and into a filling-chamber, $m^3$, therein, so as to indicate the altitude of the fluid in the tank when the cover $n'$ of the filling-chamber is removed. From this filling-chamber a pipe, $o'$, descends into the tank nearly to its bottom. On removing the said cover and pouring gasoline into the filling-chamber, such gasoline will flow therefrom into the tank. The cover when on the chamber seals it, so as to prevent escape of the gasoline-vapor from the induction-tube and the passage for the stem of the float.

Underneath the bottom of the receiver F there is a shallow chamber, I, which at one end opens into the receiver and at the other into a narrow space, $p'$, formed between one side of the receiver and a partition, $q'$, extended upward within the receiver from its bottom nearly to its top. The said shallow chamber I and narrow space $p'$ are to cause a circulation of the carbureted air within the receiver. By means of the evaporation taking place within the carburetor, the air next thereto will have its heat absorbed thereby, and therefore will be cooler. This cooler air will flow down into the chamber I, and, on being raised in temperature, will pass therefrom upward through the space $p'$, and therein into the upper part of the receiver. By this circulation of the carbureted air, the hydrocarbon vapor will be kept from condensing and separating from the air.

Having thus described my improved air-carbureting apparatus, what I claim as my invention is as follows:

1. The combination, with the water and air induction pipe, its stop-cock, the air-trap, and aerometer, as explained, of mechanism, substantially as described, for opening and closing the said cock through the action of the airometer-bell, as specified, such mechanism consisting of the knee-lever, sliding connection-rod and its stops, the bifurcated and weighted lever, and the pins, all being adapted to the valve-stem of the cock and to the guide-frame of the bell, essentially as set forth.

2. The combination of the shallow chamber I and vertical space $p'$ with the carbureted-air receiver and the carburetor arranged therein, as set forth.

WILLIAM FREEMAN BURROWS.

Witnesses:
R. H. EDDY,
E. B. PRATT.